United States Patent
Choi et al.

(10) Patent No.: US 7,312,942 B2
(45) Date of Patent: Dec. 25, 2007

(54) MOBILE COMMUNICATION TERMINAL AND METHOD OF REDUCING POWER CONSUMPTION OF A HARD DISK DRIVE OF A MOBILE COMMUNICATION TERMINAL

(76) Inventors: Jin-Hyuk Choi, #Na-1413, Hanseonggirin APT., Beomil 1-dong, Dong-gu, Busan (KR); Hark-Sang Kim, #108-1102, Universia Seonsuchon, 697, Dongcheon-dong, Buk-gu, Daegu (KR); Seok-Hyo Park, #106-505, Daewoo APT., Gupyeong-dong, Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 11/254,861

(22) Filed: Oct. 21, 2005

(65) Prior Publication Data

US 2006/0109582 A1    May 25, 2006

(30) Foreign Application Priority Data

Nov. 19, 2004  (KR) ...................... 10-2004-0095096

(51) Int. Cl.
*G11B 15/18*    (2006.01)
*G11B 17/00*    (2006.01)
*G11B 21/02*    (2006.01)
*G11B 5/596*    (2006.01)

(52) U.S. Cl. ............................. 360/69; 360/71; 360/75

(58) Field of Classification Search ...................... None
See application file for complete search history.

(56) References Cited

U.S. PATENT DOCUMENTS 6,973,535 B2 *  12/2005  Bruner et al. ............... 711/112

* cited by examiner

*Primary Examiner*—William R. Korzuch
*Assistant Examiner*—Jason Olson

(57) ABSTRACT

A mobile communication terminal and a method for reducing power consumption for driving a hard disk drive (HDD) of a mobile communication terminal are provided when controlling an interface between a transition integrated circuit (TIC) that takes charge of the interface with the HDD built in the mobile communication terminal and the HDD. The terminal and method include producing an HDD access request signal, initializing the TIC by resetting the TIC through a power-on of the TIC, performing an access of the HDD by driving the HDD after the initialization of the TIC is completed, and turning off an operation power of the TIC after the access of the HDD is completed.

6 Claims, 5 Drawing Sheets

MOBILE COMMUNICATION TERMINAL AND METHOD OF REDUCING POWER CONSUMPTION OF A HARD DISK DRIVE OF A MOBILE COMMUNICATION TERMINAL

PRIORITY

This application claims the benefit under 35 U.S.C. 119(a) of a Korean Patent Application entitled "Method of Reducing Power Consumption of a Hard Disk Drive of a Mobile Communication Terminal", filed in the Korean Industrial Property Office on Nov. 19, 2004 and assigned Serial No. 2004-95096, the entire contents of which are hereby incorporated by reference.

BACKGROUND OF THE INVENTION

1. Field of the Invention

The present invention relates to a method for controlling an interface between a Transition Integrated Circuit (TIC) that controls the interface with a hard disc drive (HDD) built in a mobile communication terminal and the HDD. More particularly, the present invention relates to a method for controlling an interface that can minimize the power consumption of the mobile communication terminal.

2. Description of the Related Art

Generally, a mobile communication terminal represents a device that wirelessly communicates with a base station, and primarily performs phone calls. In the present state, however, additional functions for processing multimedia information have gradually added to the mobile communication terminal in addition to the phone call function. For example, a camera may be attached to the mobile communication terminal to process image data and additional functions such as music files, electronic pocket books, and so on, may be performed in the mobile communication terminal. In order to process the multimedia functions as described above, in other words, in order to store media data such as music and image data, such as moving image and still image, the mobile communication terminal requires a large memory capacity.

To achieve this, the mobile communication terminal is provided with an auxiliary memory built in the terminal or provided outside the terminal. A semiconductor memory or a disk memory may be used as the auxiliary memory. The semiconductor memory may be a nonvolatile memory such as a flash memory and the disk memory may be an HDD, an Optical Disk Drive (ODD), and so on. The ODD may comprise a Write Once Read Many (WORM)-type CD-ROM, digital video disc (DVD), and so on.

Meanwhile, in the case of the mobile communication terminal having the HDD as the auxiliary memory (hereinafter referred to as a hard-disk mobile communication terminal), the terminal performs a data access process as needed in order to write/read the data into/out of the HDD.

FIG. 1 is a block diagram illustrating a construction required to write/read data into/out of an HDD in a mobile communication terminal.

A Transition Integrated Circuit (TIC) 120 comprises an interface that takes part in the data and address input/output (I/O) with respect to the HDD. The TIC 120 supports a true Integrated Drive Electronics (IDE) mode and performs the interface between a control unit 110 and the HDD 130. Accordingly, the TIC 120 should always be in a wake state so that the HDD 130 in the true IDE mode can achieve a smooth interface with the control unit 110. In other words, since a HDD access request clock may unexpectedly be produced, power should always be supplied to the TIC 120 by way of precaution against this.

The TIC 120 should always be in a wake state for the above-described reason, and it causes unnecessary power consumption to occur. That is, as illustrated in FIG. 2, since the power should always be supplied to the TIC in order to perform irregular HDD access, power 204 for operating the TIC should always be provided in addition to power 202 for driving the HDD. This is quite inefficient in consideration of the limited power capacity of a battery provided in a mobile communication terminal. If a stable power should continuously be supplied to the TIC for instantaneous access to the HDD, a continuous power consumption also occurs, resulting in a user being unable to use the mobile communication terminal for a sufficient time although the battery of the mobile communication terminal has been charged once.

SUMMARY OF THE INVENTION

Accordingly, the present invention has been designed to solve the above and other problems, and an object of the present invention is to provide an algorithm for minimizing the battery power that is consumed while the hard disk drive (HDD) of the mobile communication terminal is driven. Also, an aspect of the present invention is to achieve stable HDD access by securing a sufficient Transition Integrated Circuit (TIC) initialization time before the HDD is driven.

In order to accomplish the above and other objects, a mobile communication terminal and method are provided of reducing power consumption of a HDD of a mobile communication terminal in a method for controlling an interface between a TIC that takes charge of the interface with the HDD built in the mobile communication terminal and the HDD, according to an exemplary embodiment of the present invention. The method comprises the steps of producing an HDD access request signal, initializing the TIC by resetting the TIC through a power-on of the TIC, accessing the HDD by driving the HDD after the initialization of the TIC is completed, and turning off an operation power of the TIC after the access of the HDD is completed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Exemplary embodiments of the present invention will be described in greater detail hereinafter with reference to the accompanying drawings. A detailed description of known functions and configurations incorporated herein will be omitted for clarity and conciseness. Although a number of specific features such as detailed constituent elements are given in the following description of the present invention, they are presented for a better understanding of the present invention only. Also, it will be clear to those skilled in the art that such specific features can easily be changed or modified within the scope of the present invention.

Figure 3:
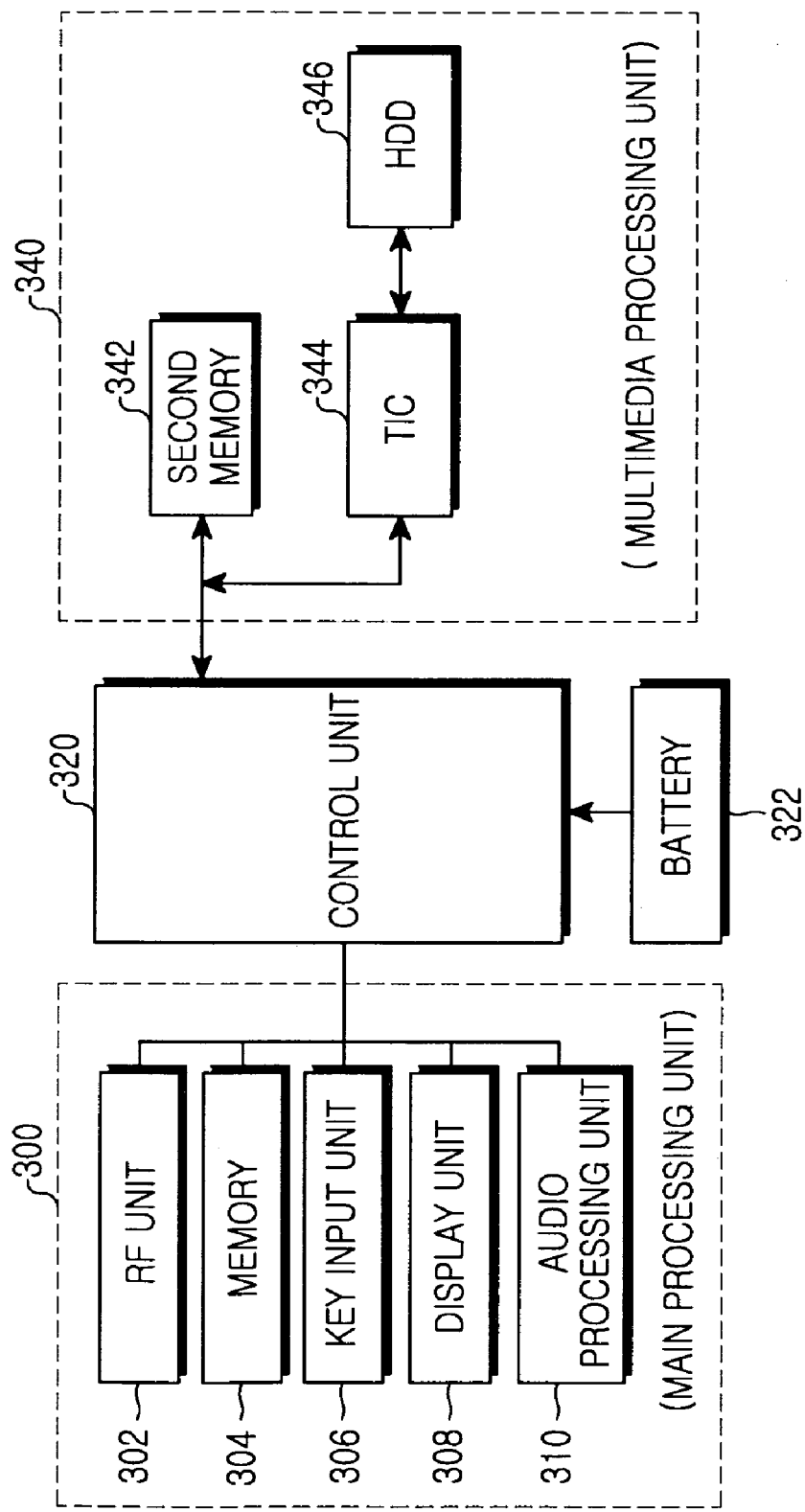
FIG. 3 is a block diagram illustrating the internal construction of a hard-disk mobile communication terminal according to an exemplary embodiment of the present invention.

FIG. 3 is a block diagram illustrating the internal construction of a hard-disk mobile communication terminal according to an exemplary embodiment of the present invention.

Referring to FIG. 3, the hard-disk mobile communication terminal according to an exemplary embodiment of the present invention comprises a main processing unit 300, a multimedia processing unit 340, a control unit 320 and a battery 322. The main processing unit 300 performs call destination/origination and a call processing function so as to place a phone call that is the original function of the hard-disk mobile communication terminal, and the multimedia processing unit 340 processes media data stored in the HDD provided in the hard-disk mobile communication terminal and wireless media data received through a RF unit.

The main processing unit 300 comprises a RF unit 302, a first memory 304, a key input unit 306, a display unit 308, and an audio processing unit 310. The RF unit 302 performs a wireless data communication of the hard-disk mobile communication terminal, and the first memory 304 stores an Operating System (OS) and operation programs, manager data and user data. The key input unit 306 provides a keypad for user interface, and the display unit 308 provides a display means such as LCD and so on that displays image data. The audio processing unit 310 processes related audio data. The main processing unit 300 performs a wireless call destination/origination that is the original function of the terminal through the respective function units. Since operations of the respective function units are well known in the art, the detailed explanation thereof will be omitted for clarity and conciseness.

Meanwhile, the multimedia processing unit 340 retrieves and processes the media data stored in the HDD that is an auxiliary memory. The media data may be image data that comprise moving image data according to moving image compression algorithms such as Audio Video Interleave (AVI), Moving Picture Experts Group (MPEG), and so on, and still image data according to still image compression algorithms such as Joint Photographic Experts Group (JPEG) and so on, and audio data according to audio data compression algorithms such as MPEG, audio layer 3 (MP3), WAV, and so on. For example, if a specified MP3 music file reproduction request is input from a user, the multimedia processing unit 340 retrieves and reproduces the corresponding MP3 music file stored in the HDD. Additionally, if a specified MPEG moving image file reproduction request is input from the user, the multimedia processing unit 340 retrieves and reproduces the corresponding MPEG moving image file stored in the HDD. To achieve this, the multimedia processing unit 340 comprises the HDD 346, TIC 344 and a second memory 342.

The second memory 342 represents a temporary buffer for temporarily storing media data such as image data, audio data, and so on, and may be implemented by (SDRAM) and so on. The media data to be reproduced is retrieved from the HDD 346 and then written in the second memory 342, so that the media data can properly be reproduced without loss. Specifically, when accessing the media data written in the HDD 346, the control unit 320 temporarily writes the media data from the HDD 346 in the temporary buffer in the second memory 342. Here, the whole area of the second memory is not used as the temporary buffer, but a part of the second memory 342 having a predetermined size (for example, 32 or 64 megabytes (MB)) is used as the temporary buffer.

The HDD 346, which represents a recording medium for writing the media data, refers to an auxiliary storage device that writes/reads data while rotating a circular aluminum substrate on which a magnetic substance is coated. The hard-disk mobile communication terminal can write/reproduce diverse media data of a large capacity in the range of several hundred megabytes (MB) to several tens of gigabytes (GB) by writing/reading the media data into/out of the HDD 346.

The TIC 344 performs a memory interface function so as to support the data and address input/output (I/O) interface function of the control unit 320. Specifically, the HDD 346 is an element that is supported only in the true Integrated Drive Electronics (IDE) mode, and the TIC 344 performs the interface between the control unit 320 and the HDD 346 by supporting the true IDE mode.

The term 'IDE' refers to the standard electronic interface that is used between a data bus of a mother board and the HDD. The HDD 346 supports the IDE interface, and the control unit 320 may be interfaced in an I/O mode, memory mode and true IDE mode. Accordingly, in the case in which the HDD 346 supports the IDE interface function and simultaneously the control unit 320 supports all the interface functions in the I/O mode, memory mode and true IDE mode, it is not required to use the TIC 344. In this case, the control unit 320 can directly access the data from the HDD 346. However, in the case in which the control unit 320 only supports the interface functions in the I/O mode and the memory mode but does not support the interface function in the true IDE mode, although the HDD 346 supports the IDE interface function, the control unit 320 cannot directly access the HDD 346, and thus the TIC 344 is provided for the IDE interface between the control unit 320 and the HDD 346. Accordingly, as described above, in the case in which the control unit 320 accesses the HDD 346 through the TIC 344, the control unit 320 interfaces in the I/O mode or memory mode, and the TIC 344 performs the IDE interface with the HDD 346. Thereafter, the TIC 344 converts the data interfaced with the HDD 346 in the true IDE mode into an interface type of the control unit 320 to transfer the data to the control unit 320.

Referring again to FIG. 3, the media data processing under the control of the control unit 320 will now be explained. The key data input through the key input unit 306 is transmitted to the control unit 320. Among the media data, the audio data is processed by the control unit 320, and then decoded and reproduced through the audio processing unit 310. The image data is displayed on the display unit 308 under the control of the control unit 320. Generally, a JPEG coding method may be used for the still image data, and an MPEG coding method may be used for the moving image data. Accordingly, the control unit 320 is provided with a JPEG codec and an MPEG codec to process the image data. In the same manner, an MP3 coding method may generally be used for the audio data. In this case, an MP3 codec is provided to process the audio data. If the compression is made through another coding method except for the coding methods such as JPEG, MPEG, MP3, and so on, the control unit 320 may be provided with another necessary codec to process the corresponding media data.

In order to process the media data as described above, the control unit 320 attempts to perform an access by non-periodically transmitting an HDD access command, for example, a reading/writing command, to the HDD through the TIC 344. To achieve this, the operation power should always be supplied to the TIC 344, and this causes unnecessary power consumption. In order to solve this problem, an algorithm that turns on the power of the TIC 344 only when the HDD access command is received from the control unit 320 is proposed as shown in FIG. 4.

Figure 4:
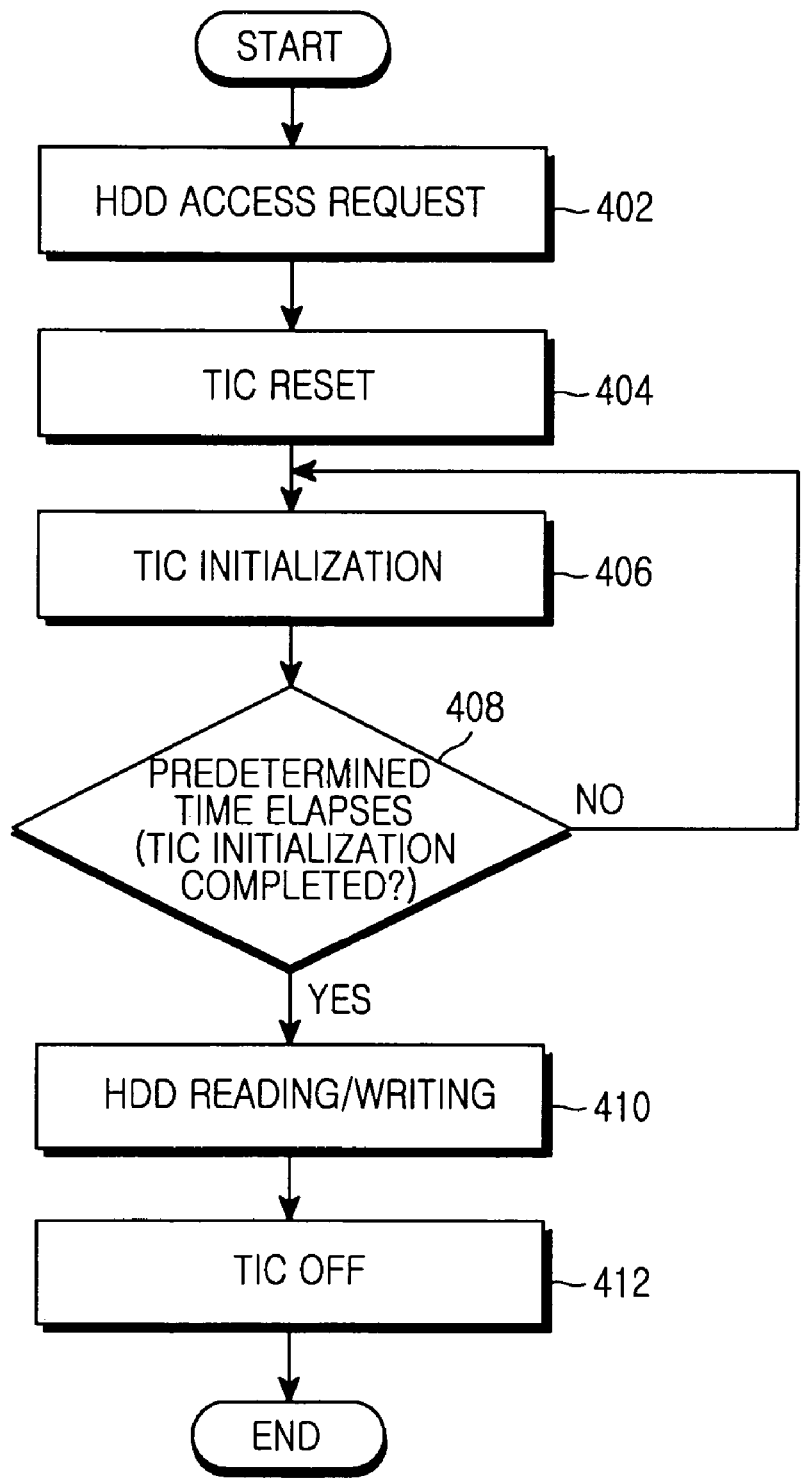
FIG. 4 is a flowchart illustrating an interface process of the TIC according to an exemplary embodiment of the present invention.

FIG. 4 is a flowchart illustrating a process of driving the TIC for the access of the HDD according to an exemplary embodiment of the present invention.

Figure 5:
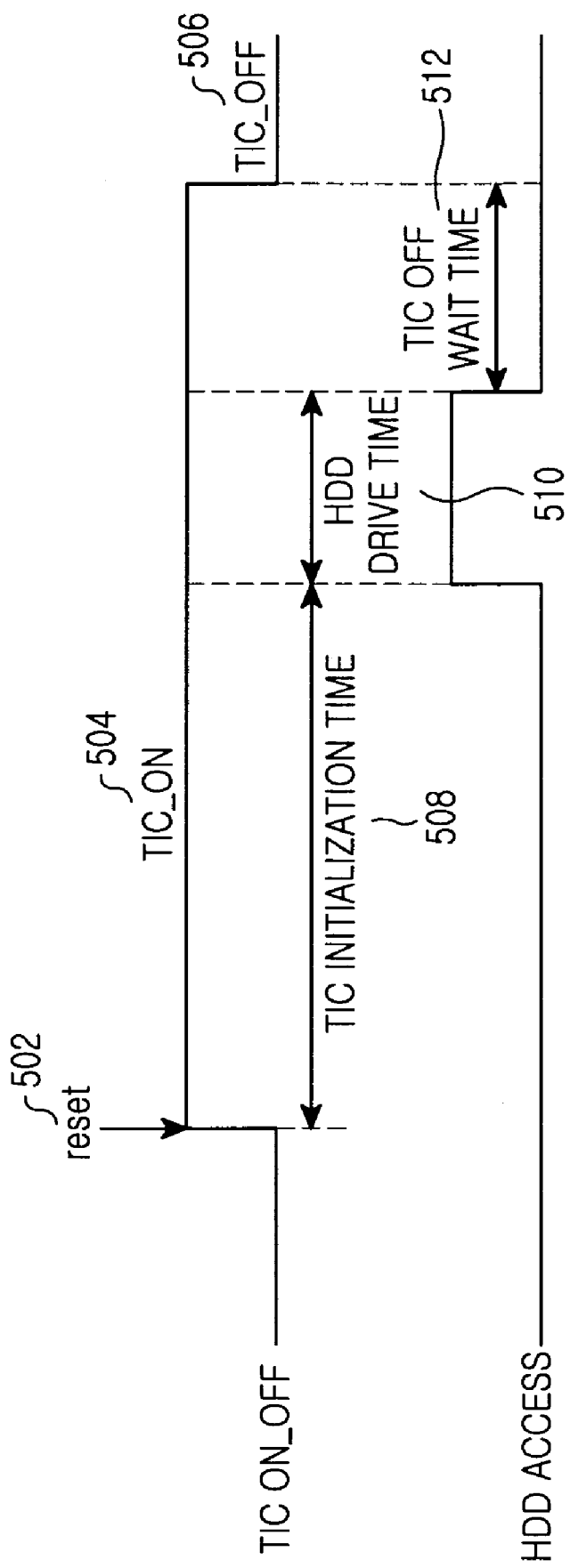
FIG. 5 is a timing diagram illustrating a TIC on-off clock and an HDD access clock according to an exemplary embodiment of the present invention.

Referring to the flowchart of FIG. 4 and a timing diagram of FIG. 5, if an HDD access request for reading the media data written in the HDD 346 or writing specified media data in the HDD is input, the control unit requests the TIC to access a specified address in the HDD at step 402.

The TIC which has received the HDD access request performs an interface with the HDD. To achieve this, the TIC 344 first performs a TIC reset process at step 404. That is, in order for the TIC to perform reading/writing of a signal with respect to a specified address in the HDD, address, media data (that is necessary in the case of writing), and so on, it first performs the TIC reset process at step 404. The reset process is a process of changing the state of the TIC from a power-off state to a power-on state. In a standby state, the TIC is maintained in the power-off state, and if the HDD access request is input from the control unit at step 402, the operation power of the TIC is turned on as illustrated in FIG. 5.

After the TIC reset at step 404, the TIC performs an initialization process at step 406 without performing an interface with the HDD. The TIC initialization process, as illustrated in FIG. 5, requires a TIC initialization time 508 such as a TIC self-reset, TIC stabilization clock generation, TIC firmware booting, memory check, TIC hardware initialization, and so on.

During the time 508 for the initialization process, the TIC should not attempt to access the HDD. If the TIC attempts to read/write media data into/out of the HDD just after the power of the TIC is turned on, the TIC is not yet in a normal mode, and thus the media data and address transmitted from the control unit to the TIC cannot efficiently be recognized by the TIC. Specifically, if the TIC is reset at point 502 and the power of the TIC is turned on during time 504, it performs the self-initialization process at step 406 for driving the TIC, and if the transmission of the media data and address of the HDD to the TIC is performed before the TIC initialization process is completed, the TIC cannot normally process the received media data and address. Accordingly, since an access error may occur if the access request is performed while the TIC is in the initialization mode at step 406 that is not the normal mode, a specified wait time 508 for the initialization after the TIC reset is required.

If it is assumed that about 50 milliseconds is required for the above-described initialization work, the TIC should attempt the interface with the HDD after the TIC initialization time of 50 ms elapses. To achieve this, the control unit determines whether the TIC initialization time elapses at step 408. After the TIC initialization time elapses, the control unit transmits media data, address signal and reading/writing command signals to the TIC. The TIC which has received the above-described signals performs the reading/writing operation requested by the control unit by performing the interface with the HDD at step 410 (HDD drive time 510).

After the access work for the HDD is completed, the HDD and the TIC enter a low-power mode, which is performed by the TIC-off command. The TIC-off command is for the complete removal of the power of the HDD and the TIC, and refers to a command wait time 512. During the wait time 512, the HDD is stopped and its head is unloaded. The wait mode time should be considered so much that the system guarantees the interface performance. After the TIC is off at step 412 at point 506, the HDD access process is terminated.

Consequently, by turning on the TIC in advance only at the moment the HDD is accessed as illustrated in the flowchart of FIG. 4, the power required by the TIC when the HDD is driven can be minimized.

Figure 6:
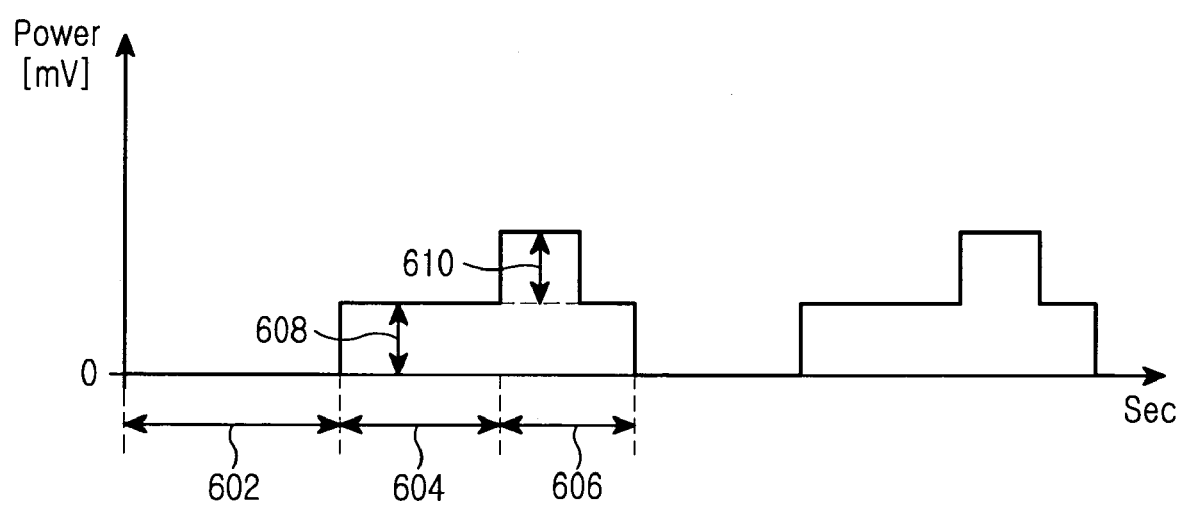
FIG. 6 is a graph illustrating the power consumption of the TIC interface according to an exemplary embodiment of the present invention.

FIG. 6 is a graph illustrating the power consumption of the TIC interface according to an exemplary embodiment of the present invention.

Figure 1:
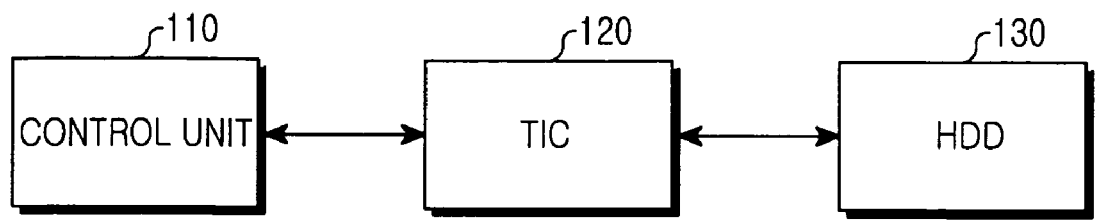
FIG. 1 is a block diagram illustrating a conventional construction required to perform a multimedia process function in a hard-disk mobile communication terminal.
Figure 2:
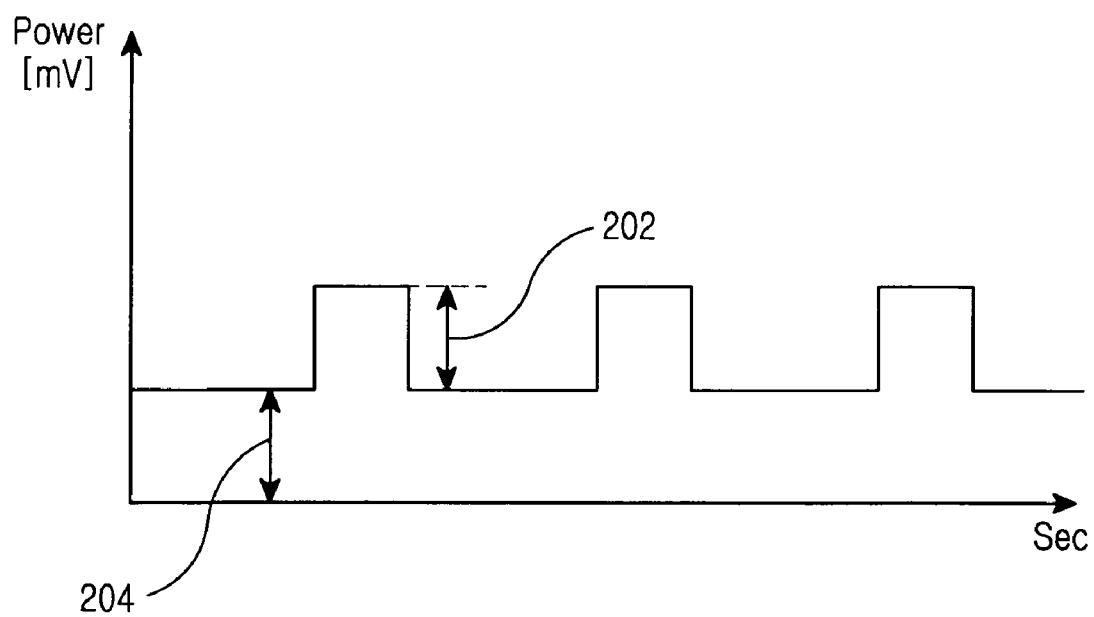
FIG. 2 is a graph illustrating the power consumption of a conventional Transition Integrated Circuit (TIC) interface.

As illustrated in FIG. 6, in a period 602 in which no HDD access attempt is made, the HDD drive power and the TIC operation power are not consumed. If the HDD access attempt is made, the TIC is first initialized in a period 604 to cause a power consumption 608, and then the HDD is driven in an HDD access period 606 to cause a power consumption 610 in order to drive the HDD. In comparing the power consumption graph of FIG. 6 according to an exemplary embodiment of the present invention with that of FIG. 2 according to the prior art, it can be recognized that the power consumption for accessing the HDD is reduced and thus the use time of the terminal battery is lengthened.

As described above, according to exemplary embodiments of the present invention, by turning on the TIC, which is usually in an off state, only when the HDD access attempt is made, the power consumption of the terminal battery can be minimized. Additionally, by securing the TIC initialization time, a stable HDD access can be performed without any access error.

While the present invention has been shown and described with reference to certain exemplary embodiments thereof such as a mobile communication terminal, it will be understood by those skilled in the art that various changes in form and details may be made therein without departing from the spirit and scope of the present invention as defined by the appended claims.

What is claimed is:

1. A method of reducing power consumption of a hard disk drive (HDD) of a mobile communication terminal, the method comprising:

producing a HDD access request signal;

initializing a transition integrated circuit (TIC) by resetting the TIC through a power-on of the TIC;

determining whether the initialization of the TIC is completed or not;

completing the TIC initialization when a predetermined wait time elapses after determining the completion of the TIC initialization;

accessing a HDD by driving the HDD;

turning off an operation power of the TIC after the access of the HDD is complete; and repeatedly performing the TIC initialization when the predetermined wait time does not elapse after determining the completion of the TIC initialization.

2. The method as claimed in claim 1, wherein until the initialization of the TIC is completed, all data information and address information received in the TIC are disregarded and not processed.

3. The method as claimed in claim 1, wherein the turning off the operation power of the TIC comprises turning off the operation power of the TIC after the HDD is stopped and its head is unloaded.

4. A mobile communication terminal comprising:
 a transition integrated circuit (TIC);
 a hard disk drive (HDD); and
 an interface between TIC and HDD;
 a controller for initializing the TIC by resetting the TIC through a power-on of the TIC when a HDD access is requested, completing the TIC initialization when a predetermined wait time elapses after determining the completion of the TIC initialization, repeatedly performing the TIC initialization when the predetermined wait time does not elapse, accessing the HDD by driving the HDD after the TIC is initialized, and turning off an operation power of the TIC after the access to the HDD is completed.

5. The apparatus as claimed in claim 4, wherein until the initialization of the TIC is completed, the controller disregards and does not process all data information and address information received in the TIC.

6. The apparatus as claimed in claim 4, wherein the controller turns off the operation power of the TIC after the HDD is stopped and its head is unloaded.

* * * * *